(12) United States Patent
Kim

(10) Patent No.: US 10,464,519 B2
(45) Date of Patent: Nov. 5, 2019

(54) AIRBAG FOR OBLIQUE CRASH PROTECTION

(71) Applicant: TRW Vehicle Safety Systems Inc., Washington, MI (US)

(72) Inventor: Young S. Kim, Rochester, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 71 days.

(21) Appl. No.: 15/786,870

(22) Filed: Oct. 18, 2017

(65) Prior Publication Data
US 2019/0111882 A1  Apr. 18, 2019

(51) Int. Cl.
| | |
|---|---|
| *B60R 21/231* | (2011.01) |
| *B60R 21/205* | (2011.01) |
| *B60R 21/237* | (2006.01) |
| *B60R 21/00* | (2006.01) |
| *B60R 21/233* | (2006.01) |

(52) U.S. Cl.
CPC .......... *B60R 21/231* (2013.01); *B60R 21/205* (2013.01); *B60R 21/237* (2013.01); *B60R 2021/0009* (2013.01); *B60R 2021/23107* (2013.01); *B60R 2021/23308* (2013.01)

(58) Field of Classification Search
CPC .......................... B60R 21/205; B60R 21/2338
See application file for complete search history.

(56) References Cited

U.S. PATENT DOCUMENTS

| | | | | | |
|---|---|---|---|---|---|
| 4,262,931 | A | * | 4/1981 | Strasser ................ | B60R 21/233 280/729 |
| 5,380,038 | A | * | 1/1995 | Hawthorn ............. | B60R 21/233 280/730.1 |
| 5,609,363 | A | * | 3/1997 | Finelli ................... | B60R 21/231 280/730.1 |
| 9,162,645 | B2 | * | 10/2015 | Cho ....................... | B60R 21/205 |
| 9,248,799 | B2 | * | 2/2016 | Schneider ............. | B60R 21/205 |
| 9,272,684 | B1 | * | 3/2016 | Keyser .................. | B60R 21/237 |
| 9,340,176 | B2 | * | 5/2016 | Belwafa ................ | B60R 21/233 |
| 9,358,945 | B2 | * | 6/2016 | Yamada ................ | B60R 21/233 |
| 9,376,084 | B2 | * | 6/2016 | Choi ..................... | B60R 21/233 |
| 9,421,942 | B2 | * | 8/2016 | Shin ...................... | B60R 21/239 |
| 9,428,139 | B2 | * | 8/2016 | Yamada ................ | B60R 21/233 |
| 9,428,140 | B2 | * | 8/2016 | Lee ....................... | B60R 21/239 |

(Continued)

*Primary Examiner* — Faye M Fleming
(74) *Attorney, Agent, or Firm* — Tarolli, Sundheim, Covell & Tummino LLP

(57) ABSTRACT

An apparatus for helping to protect an occupant of a vehicle includes a main airbag inflatable to cover a portion of a vehicle and to help provide protection from impacts with the covered portion of the vehicle, and an auxiliary airbag connected to the main airbag, the auxiliary airbag being inflatable to cover portions of the vehicle left uncovered by the main airbag. The auxiliary airbag includes a deployment portion and a restriction panel. The deployment portion is inflatable to extend from the main portion and having a first length. The restriction panel has a second length that is shorter than the first length. The restriction panel overlies the deployment portion and has opposite ends connected to opposite ends of the deployment panel. The deployment portion, when inflated, is configured to tension the restraining panel between the opposite ends of the deployment portion and position the restraining panel for receiving and absorbing impacts.

19 Claims, 7 Drawing Sheets

(56) References Cited

U.S. PATENT DOCUMENTS

| | | | |
|---|---|---|---|
| 9,505,372 B2* | 11/2016 | Yamada | B60R 21/2338 |
| 9,550,469 B2* | 1/2017 | Sato | B60R 21/233 |
| 9,555,762 B2* | 1/2017 | Umehara | B60R 21/233 |
| 9,580,039 B2* | 2/2017 | Schneider | B60R 21/233 |
| 9,738,243 B2* | 8/2017 | Fukawatase | B60R 21/2338 |
| 9,796,354 B1* | 10/2017 | Hayashi | B60R 21/239 |
| 9,902,361 B2* | 2/2018 | Lee | B60R 21/205 |
| 9,969,349 B2* | 5/2018 | Cheng | B60R 21/231 |
| 10,023,144 B2* | 7/2018 | Taguchi | B60R 21/205 |
| 10,059,299 B2* | 8/2018 | Yamada | B60R 21/205 |
| 2006/0163848 A1 | 7/2006 | Abe | |
| 2015/0258958 A1 | 9/2015 | Belwafa et al. | |
| 2015/0298643 A1 | 10/2015 | Schneider et al. | |
| 2016/0046254 A1 | 2/2016 | Yamada et al. | |
| 2017/0217399 A1 | 8/2017 | Patel et al. | |
| 2017/0369019 A1* | 12/2017 | Jeong | B60R 21/2346 |
| 2018/0037188 A1* | 2/2018 | Ohno | B60R 21/262 |
| 2018/0056920 A1* | 3/2018 | Paxton | B60R 21/233 |
| 2018/0065587 A1* | 3/2018 | Maenishi | B60R 21/205 |
| 2018/0154856 A1* | 6/2018 | Yamada | B60R 21/231 |
| 2018/0154857 A1* | 6/2018 | Yamada | B60R 21/231 |

* cited by examiner

AIRBAG FOR OBLIQUE CRASH PROTECTION

BACKGROUND

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle collision, a vehicle rollover, or a combination thereof. Frontal collisions refer to collision events in which a vehicle experiences an impact at the front of the vehicle. These frontal collisions cause front seat vehicle occupants to move forward in the vehicle toward structures, such as the steering wheel (driver side occupant) and/or the instrument panel (passenger side occupant).

Frontal collisions of a vehicle can occur as a result of the vehicle travelling forward into an object, such as another vehicle, a tree, a pole, etc. Frontal collisions can also occur as a result of a stationary vehicle being impacted at the front by another vehicle. Frontal collisions can further occur as a result of two or more moving vehicles moving toward each other in a "head on" impact.

To help protect occupants of vehicles involved in frontal collisions, the vehicle can be equipped with driver frontal airbags. On the passenger side of the vehicle, driver frontal airbags are typically deployed from a housing located within the instrument panel of the vehicle. Because the occupant on the passenger side is not charged with operating the vehicle, the passenger driver frontal airbag can be configured to cover a large area in front of the front passenger seat, i.e., the instrument panel, windshield, etc., and can extend laterally, in both outboard and inboard directions in the vehicle, for example, from adjacent or near the passenger door to adjacent or near the centerline of the instrument panel or even beyond.

The inflatable volume of passenger frontal airbags increases with the coverage that the airbag provides. Passenger airbags also typically have a substantial depth, so as to optimize the cushioning effect it has on an impacting occupant. Passenger frontal airbags need to reach the inflated and deployed condition within a predetermined amount of time, which is a fraction of a second. To do this, the inflator is sized to deliver inflation fluid at a volumetric flow rate that will result in deployment of the airbag within the required time. All of these factors must be considered and balanced when configuring a passenger frontal airbag system. There are limitations on inflator size (the volume of inflation fluid delivered by the inflator and the rate at which it is delivered) and, because of this, the configuration of the airbag (coverage, depth, volume, etc.) has to be matched and balanced accordingly. As a result, it can be desirable to optimize the passenger airbag in terms of coverage and depth, given the capabilities of the inflator.

On the driver side of the vehicle, driver frontal airbags are typically deployed from a housing located within the steering wheel. Because the occupant on the driver side is charged with operating the vehicle, the driver frontal airbag has to be configured with this in mind. For example, the operator may not be steering the vehicle in a straight forward direction at the time of the collision and, therefore, the steering wheel can be rotated when the airbag deploys. Because of this, steering wheel mounted airbags typically have a round/circular cushion configuration that coincides with the position and attitude of the steering wheel. Additionally, the driver frontal airbag must be configured taking into account that the operator of the vehicle will likely have one or both hands on the steering wheel at the time a collision takes place. Because of this, the steering wheel mounted airbag can be configured to have a diameter that is selected to provide adequate frontal impact protection while avoiding airbag deployment into contact with the operator's hands and arms.

One particular type of collision for which an airbag may be deployed can be referred to as an oblique collision. Oblique collisions are considered generally to be any non-frontal, i.e., any non-zero degree angle, vehicle collision. In its simplest form, a frontal, zero degree angle vehicle collision would involve a vehicle impacting, for example, a flat brick wall when the vehicle is travelling at a straight forward direction perpendicular to that wall. As a result of this impact, the occupant would move forward in a direction parallel to the vehicle axis and the direction of forward vehicle travel into contact with the deployed airbag. From this, it follows that an oblique collision, i.e., a non-frontal or non-zero angle collision, would be any collision scenario that results in the occupant moving relative to the central vehicle axis and direction of forward vehicle travel in a direction that is not parallel to the axis of straight forward vehicle travel.

Oblique collisions can occur in a variety of scenarios. For example, a vehicle travelling in a straight forward direction colliding with an angled surface, such as another vehicle oriented in a non-parallel manner, would be considered an oblique collision. As another example, an offset collision in which a vehicle collides with an object, such as another vehicle, that is offset laterally would be considered an oblique collision. This would be the case, for instance, in a vehicle collision in which the front passenger side bumper strikes the rear driver side bumper of another vehicle. As a further example, vehicles colliding when travelling in directions that are not parallel, i.e., at an angle, would be considered an oblique collision.

Additionally, in oblique collision scenarios causing forward-inboard movement of a seatbelt restrained occupant, whether a driver seat occupant or a passenger seat occupant, the movement of the occupant is in a direction that escapes the shoulder belt portion of the seatbelt. By "escapes," it is meant to refer to the fact that the shoulder belt restraint extends downward and inward from the outboard shoulder across the torso and around the inboard hip. This being the case, forward-inboard occupant movement can cause the occupant's torso to slip out from behind the shoulder belt, thereby becoming partially unbelted or unrestrained.

Oblique collisions produce occupant movements in the vehicle that are also oblique, that is, the occupant moves obliquely relative to a central axis of the frontal airbag, i.e., an axis that extends through a longitudinal centerline of the airbag, which extends parallel to the longitudinal axis of the vehicle. This oblique movement can be forward-outboard (i.e., toward the door) or forward-inboard (i.e., toward the vehicle centerline). Forward-outboard movement of an occupant in response to an oblique collision can be handled through the deployment of known side or lateral airbag structures, such as side curtains, door mounted side airbags, seat mounted side airbags, pillar mounted side airbags, etc. Conventional airbag structures do not, however, cover for forward-inboard movement of the occupant. Additionally, forward-inboard moving occupants can escape the shoulder belt portion of the seatbelt, which presents further challenges.

Furthermore, prior to "escaping" in response to forward-inbound movement, the seatbelt can act on the occupant and apply restraining forces that alter the occupant's movement. For example, the seatbelt engages the occupant's outboard shoulder and, in response to the forward-inboard occupant movement, can cause the occupant to rotate toward the outboard side of the vehicle as he or she escapes the belt. As a result, the occupant can also be subjected to rotational forces that produce rotational occupant movements during an oblique vehicle collision.

Moreover, because the passenger airbag necessarily occupies a comparatively large volume, it can be challenging to provide the desired area of coverage within the necessary airbag deployment time. Since the passenger airbag is typically deployed centrally from the instrument panel, i.e., directly in front of the passenger side occupant, it can be difficult to configure the airbag to also expand laterally to provide adequate coverage for the passenger side occupant in the case of an oblique collision, while at the same time meeting deployment time requirements.

SUMMARY

According to one aspect, an apparatus for helping to protect an occupant of a vehicle includes a main airbag inflatable to cover a portion of a vehicle and to help provide protection from impacts with the covered portion of the vehicle, and an auxiliary airbag connected to the main airbag, the auxiliary airbag being inflatable to cover portions of the vehicle left uncovered by the main airbag. The auxiliary airbag includes a deployment portion and a restriction panel. The deployment portion is inflatable to extend from the main portion and having a first length. The restriction panel has a second length that is shorter than the first length. The restriction panel overlies the deployment portion and has opposite ends connected to opposite ends of the deployment panel. The deployment portion, when inflated, is configured to tension the restraining panel between the opposite ends of the deployment portion and position the restraining panel for receiving and absorbing impacts.

According to another aspect, alone or in combination with any other aspect, the restriction panel can restrict movement of the deployment portion so that the deployment portion assumes a curved configuration when inflated and pressurized facing concavely toward the restriction panel, thereby creating a space between the restriction panel and the deployment portion.

According to another aspect, alone or in combination with any other aspect, the restriction panel and the deployment portion each can have a generally rectangular configuration.

According to another aspect, alone or in combination with any other aspect, the deployment portion can include overlying panels interconnected to define an inflatable volume. The auxiliary airbag can be connected to the main airbag so that the inflatable volume of the auxiliary airbag is placed in fluid communication with an inflatable volume of the main airbag.

According to another aspect, alone or in combination with any other aspect, the deployment portion can include interior connections that interconnect the overlying panels to limit the inflated thickness of the deployment portion.

According to another aspect, alone or in combination with any other aspect, the deployment portion can include overlying panels interconnected to define an inflatable volume, and the restriction panel can overlie the panels of the deployment portion.

According to another aspect, alone or in combination with any other aspect, in the deflated condition, the auxiliary airbag can be configured so that the restriction panel and the panels of the deployment portion are 3 to 4 panel layers thick.

According to another aspect, alone or in combination with any other aspect, the auxiliary airbag, in the deflated condition, can be placed in the stored condition by at least one of rolling and folding the overlying panels.

According to another aspect, alone or in combination with any other aspect, the auxiliary airbag can be configured to inflate and deploy laterally from the main airbag.

According to another aspect, alone or in combination with any other aspect, the main airbag can be a passenger frontal airbag.

According to another aspect, alone or in combination with any other aspect, the auxiliary airbag can be configured to deploy laterally inboard from the passenger frontal airbag.

According to another aspect, alone or in combination with any other aspect, the auxiliary airbag can be configured to cover a portion of an instrument panel of the vehicle positioned laterally inboard of the passenger frontal airbag.

According to another aspect, alone or in combination with any other aspect, the auxiliary airbag can be configured to be positioned when inflated and deployed to receive an occupant moving obliquely with respect to the main airbag.

According to another aspect, alone or in combination with any other aspect, the auxiliary airbag can be configured to be positioned when inflated and deployed overlying an instrument panel of a vehicle between a passenger frontal airbag and a driver frontal airbag.

According to another aspect, alone or in combination with any other aspect, the housing can support the inflator, the main airbag, and the auxiliary airbag, and the inflator can be actuatable to supply inflation fluid for inflating the main airbag and the auxiliary airbag.

According to another aspect, alone or in combination with any other aspect, a vehicle safety system can include a frontal airbag configured to inflate from an instrument panel of a vehicle to a deployed condition covering a portion of the instrument panel, an auxiliary airbag connected to the frontal airbag and inflatable to deploy laterally inboard from the frontal airbag to cover a portion of the instrument panel left uncovered by the frontal airbag.

According to another aspect, alone or in combination with any other aspect, the auxiliary airbag can include a deployment portion inflatable to inflate laterally inboard from the frontal airbag. The deployment portion has a first length. The auxiliary airbag can also include a restriction panel having a second length that is shorter than the first length. The restriction panel can overlie the deployment portion and having opposite ends connected to opposite ends of the deployment panel. The deployment portion, when inflated, can be configured to tension the restraining panel between the opposite ends of the deployment portion. The restriction panel can restrict movement of the deployment portion in response to inflation so that the deployment portion assumes a curved configuration when inflated and pressurized facing concavely toward the restriction panel and thereby creating a space between the restriction panel and the deployment portion for receiving and absorbing impacts.

According to another aspect, alone or in combination with any other aspect, the safety system can also include a housing and an inflator. The housing can support the inflator, the frontal airbag, and the auxiliary airbag. The inflator can be actuatable to supply inflation fluid for inflating the frontal airbag and the auxiliary airbag.

According to another aspect, alone or in combination with any other aspect, an auxiliary airbag connectable to a main airbag and being inflatable to cover portions of the vehicle left uncovered by the main airbag can include a deployment portion and a restriction panel. The deployment portion can be inflatable to extend from the main portion and have a first length. The restriction panel can have a second length that is shorter than the first length. The restriction panel can overlie the deployment portion and having opposite ends connected to opposite ends of the deployment panel. The deployment portion, when inflated, can be configured to tension the restraining panel between the opposite ends of the deployment portion. The restriction panel can restrict movement of the deployment portion in response to inflation so that the deployment portion assumes a curved configuration facing concavely toward the restriction panel and thereby creating a space between the restriction panel and the deployment portion for receiving and absorbing impacts.

According to another aspect, an airbag module can include a housing, an inflator, a main airbag, and an auxiliary airbag according to any of the preceding aspects. The housing can support the inflator, the main airbag, and the auxiliary airbag. The inflator can be actuatable to supply inflation fluid for inflating the main airbag and the auxiliary airbag.

DRAWINGS

DESCRIPTION

Figure 1:
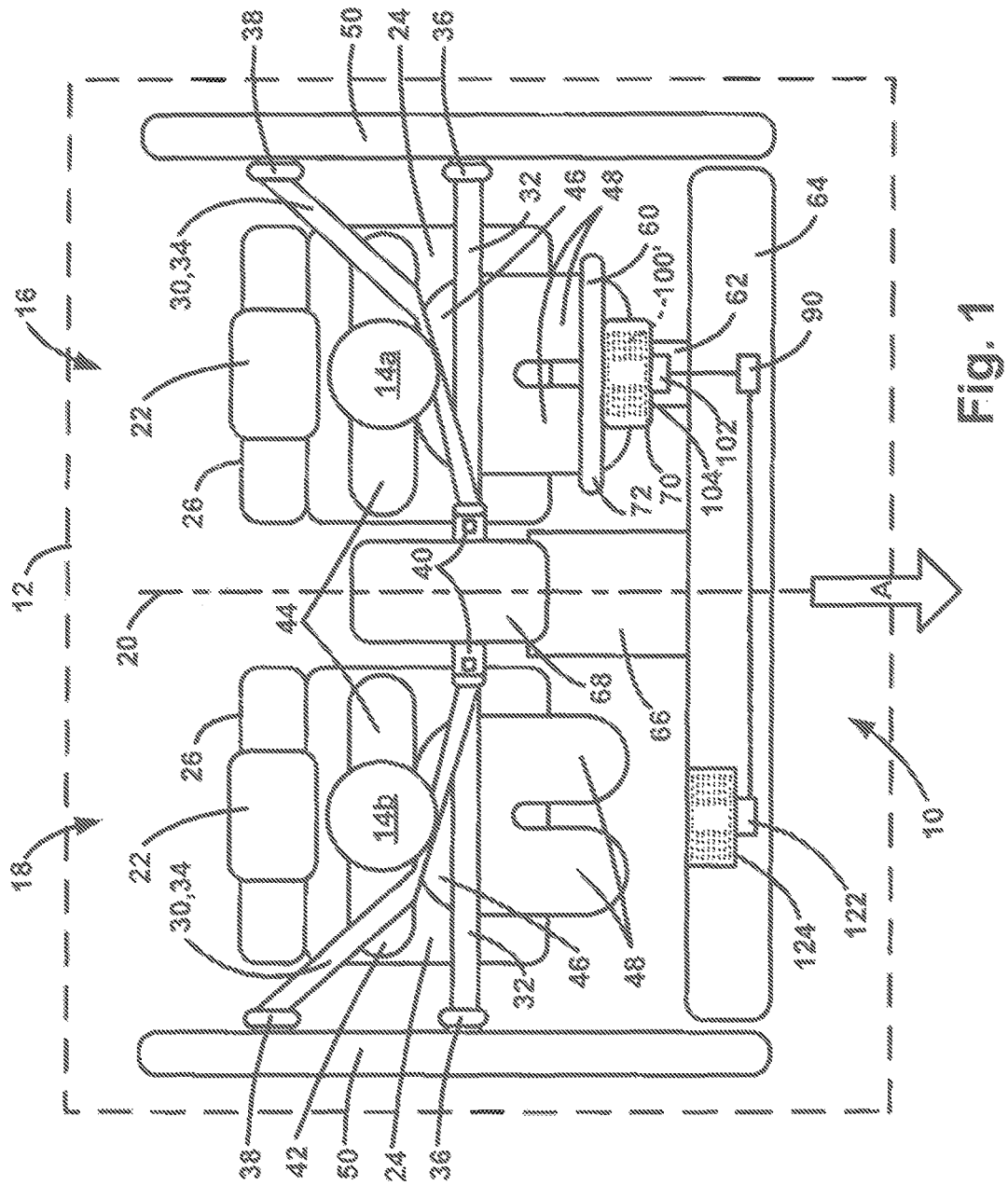
FIG. 1 is a schematic illustration of a vehicle including a safety system for helping to protect an occupant of the vehicle, according to one example configuration.
Figure 2:
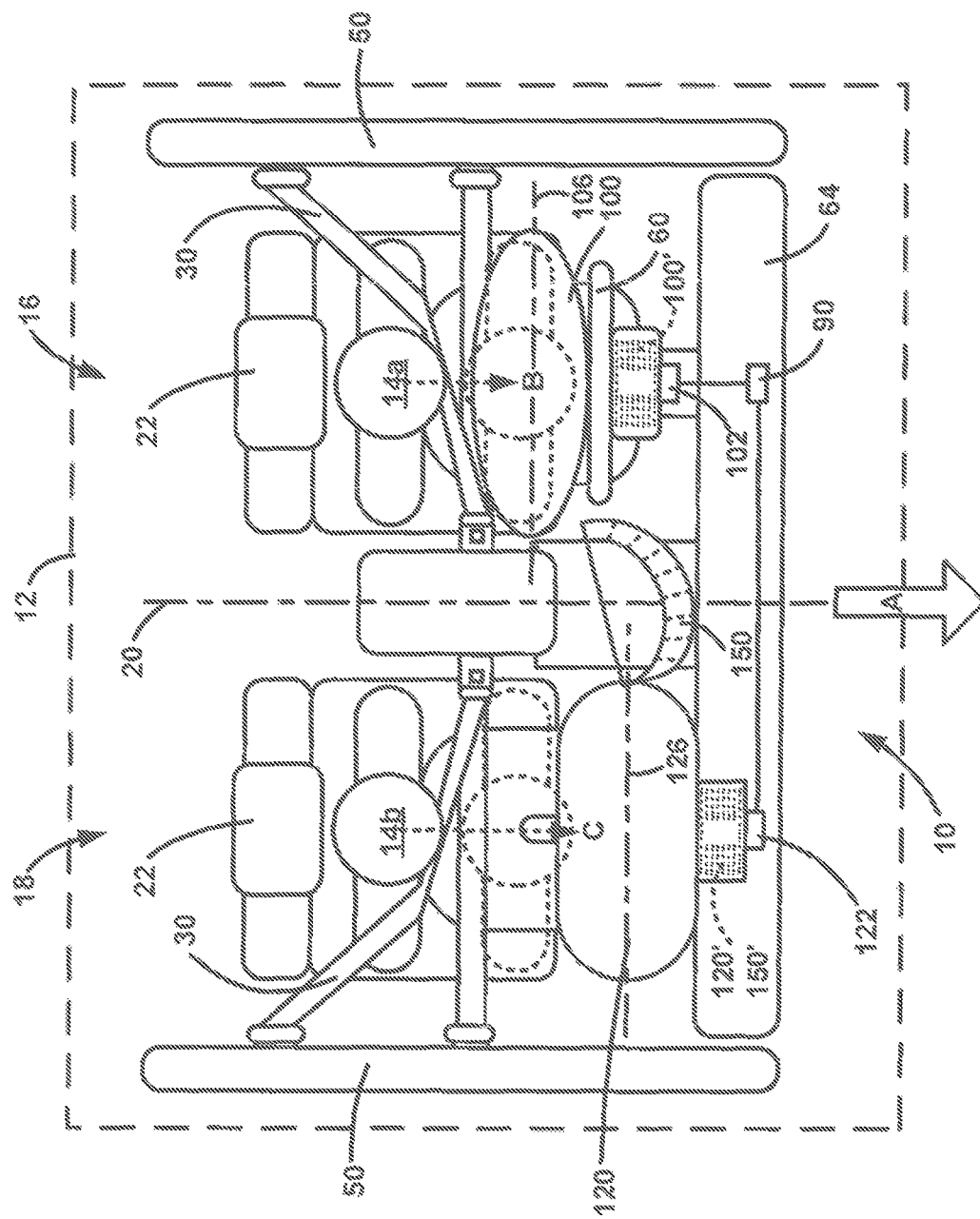
FIG. 2 is a schematic illustration of the vehicle safety system of FIG. 1 in a deployed condition and illustrating vehicle occupant movements in response to a crash scenario.
Figure 3:
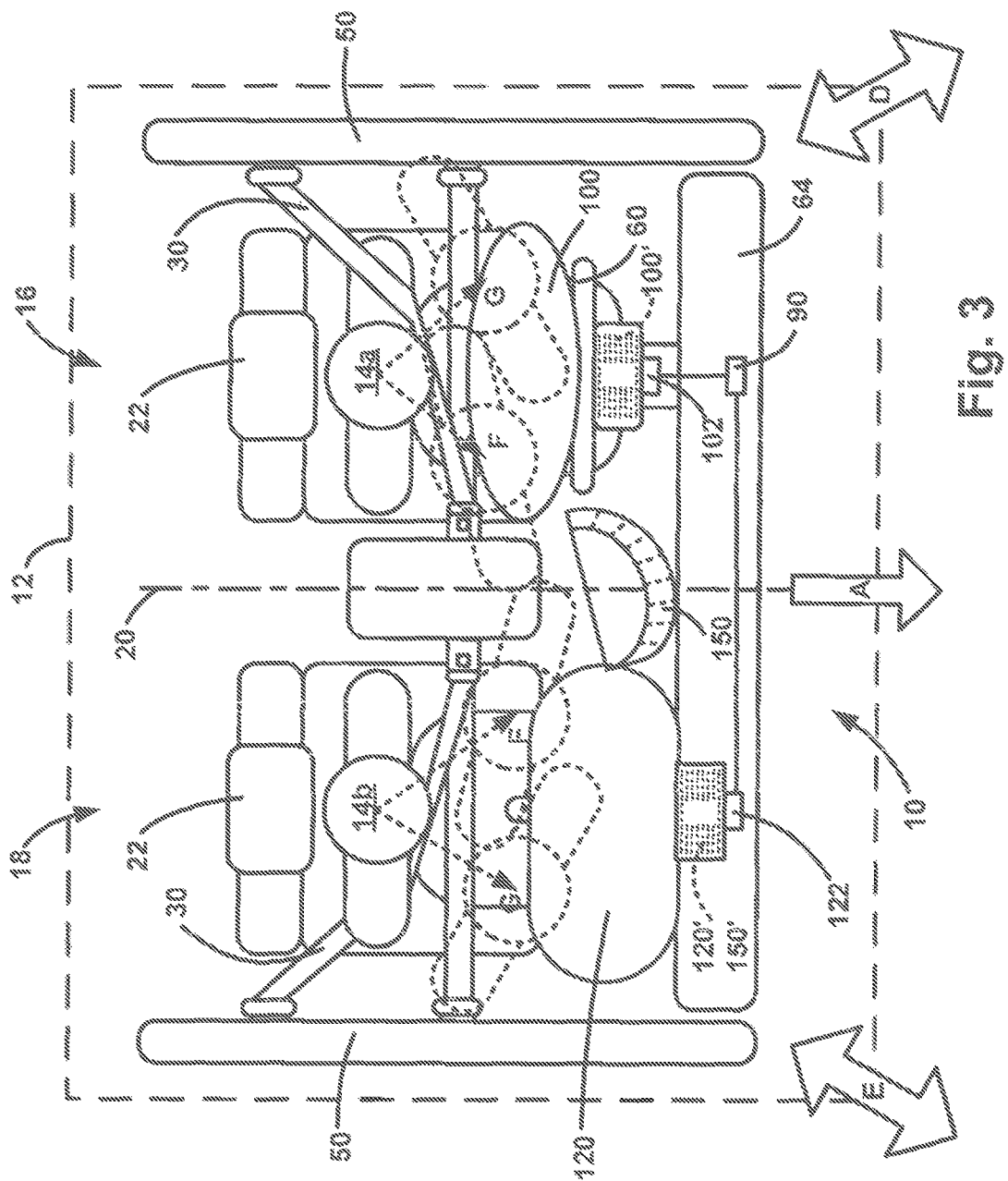
FIG. 3 is a schematic illustration of the vehicle safety system of FIG. 1 in a deployed condition and illustrating vehicle occupant movements in response to different crash scenarios.

The invention relates to an airbag that helps protect an occupant of a vehicle seat in the event of an oblique collision. Referring to FIGS. 1-3, a vehicle 12 includes a safety system 10 for helping to protect occupants 14a and 14b of front seats 20 of the vehicle 12. More specifically, the system 10 helps protect the occupant 14a of a front seat 22 on a driver side 16 of the vehicle 12, and the occupant 14b of a passenger side 18 of the vehicle. In this description, these occupants are referred to as a diver 14a and passenger 14b.

The driver side 16 and passenger side 18 of the vehicle 12 are positioned on opposite sides of a longitudinal centerline 20 of the vehicle. The driver side 16 is the side from which the driver 14a controls or operates the vehicle 12. In the illustrations of FIGS. 1-3, the driver side 16 is the side of the vehicle to the left of a vehicle centerline 20, as viewed from the perspective of the occupants 14a and 14b in a normally seated position (as shown) and looking in the direction of forward vehicle travel, as indicated generally by the arrow labeled A. Those skilled in the art will appreciate that in some countries, such as England, the driver side of the vehicle can be opposite of that illustrated in FIGS. 1-3. Those skilled in the art will further appreciate that all of the features of the system 10 described herein are equally applicable to vehicles having this "right side driver" configuration.

Each vehicle seat 22 includes a seat base or bottom 24 and a seat back 26. The safety system 10 includes seatbelts 30 for helping to restrain the occupants 14a and 14b in the seats 22. Each seatbelt 30 includes a lap belt portion 32 and a shoulder belt portion 34. Each seatbelt 30 has a first end connected to the vehicle 12 at an anchor point 36 located outboard of its associated vehicle seat bottom 24. Each seatbelt 30 has an opposite second end connected to a retractor 38 connected to a side structure 50 of the vehicle, such as a B-pillar, at a location generally at or above and outboard of an upper extent of the associated seat back 26.

Between the anchor point 36 and the D-ring/retractor 38, each seatbelt extends through a buckle 40 that is detachably anchored to the vehicle 12 on an inboard side of the associated seat bottom 22. Each shoulder belt portion 34 extends from the retractor 38, over the occupant's outboard shoulder 42, and across the torso 44 to the buckle 40 located in the region adjacent the occupant's hip 46. The lap belt portion 32 extends from the buckle 40, across the occupant's lap, i.e., the hips 46 and legs 48, to the anchor point 36.

The vehicle 12 includes a steering wheel 60 that is connected to a steering column 62 extending from an instrument panel 64 of the vehicle. The steering wheel 60 includes a central hub 70 and a rim 72 that encircles the hub. The occupant 14 can grasp the rim 72 to manipulate the steering wheel 60 to steer the vehicle 12 in a known manner.

The safety system 10 also includes a driver frontal airbag 100 that is mounted in a housing 104 formed in the steering wheel hub 70. The driver frontal airbag 100 has a stored condition, illustrated in dashed lines at 100' in FIGS. 1 and 2, in which the airbag is folded, rolled, or otherwise placed within the housing 104 in the steering wheel hub 70. The driver frontal airbag 100 is inflatable from the stored condition (dashed lines at 100') to the deployed condition (solid lines at 100) as shown in FIG. 2. The safety system 10 includes an inflator 102 that is actuatable to produce inflation fluid for inflating the driver frontal airbag 100 in a known manner.

The safety system 10 also includes a passenger frontal airbag 120 that is mounted in a housing 124 formed in the instrument panel 64. The passenger frontal airbag 120 has a stored condition, illustrated in dashed lines at 120' in FIGS. 1 and 2, in which the airbag is folded, rolled, or otherwise placed within the housing 124 in the instrument panel 64. The passenger frontal airbag 120 is inflatable from the stored condition (dashed lines at 120') to the deployed condition (solid lines at 120) as shown in FIG. 2. The safety system 10 includes an inflator 122 that is actuatable to produce inflation fluid for inflating the passenger frontal airbag 120 in a known manner.

In the deployed condition, the driver frontal airbag 100 covers the steering wheel 60 and helps protect the driver 14a from impacts with the steering wheel by cushioning impacts with the occupant and helping to provide a controlled deceleration or "ride down" effect. Because the steering wheel 60 is rotated during vehicle operation, the shape of the driver frontal airbag 100 is round (as viewed from the occupant's perspective) and generally centered on the steering wheel axis of rotation. This way, the driver frontal airbag 100 provides the same degree of coverage regardless of the rotational position of the steering wheel 60 at the time of deployment.

In the deployed condition, the passenger frontal airbag 120 covers the portions of the instrument panel 64 positioned forward (as viewed in the direction of arrow A) of the passenger 14b. The passenger frontal airbag 120 helps protect the passenger 14b from impacts with the instrument panel 64 by cushioning impacts with the occupant and helping to provide a controlled deceleration or "ride down" effect. Because the passenger 14b is not charged with operating the vehicle 12, his or her position in the passenger side 18 seat 22 can vary. As a result, the passenger frontal airbag 120 is configured to cover a large area of the instrument panel 64.

Referring to FIGS. 2 and 3, the safety system 10 also includes an auxiliary airbag 150 for helping to protect occupants 14a, 14b in the event of an oblique crash event. The auxiliary airbag 150 is an inflatable vehicle occupant protection device that is attached to a main airbag. The auxiliary airbag 150 thus supplements the protection afforded by the main airbag. The main airbag can be any conventional airbag structure, such as a frontal airbag, a door-mounted side impact airbag, a seat-mounted side impact airbag, a pillar airbag, a curtain airbag, a frontal airbag for rear seat occupants, a knee bolster, or an inflatable seatbelt.

In the embodiment illustrated in FIGS. 2 and 3, the auxiliary airbag 150 is connected to a main airbag in the form of the passenger frontal airbag 120. The auxiliary airbag 150 supplements the protection afforded by the passenger frontal airbag 120 by extending its lateral coverage of the vehicle 12. The auxiliary airbag 150 is connected to the passenger frontal airbag 120 in a manner such that their respective inflatable volumes are fluidly connected with each other. In this manner, the inflator 122 associated with the passenger frontal airbag 120 can provide the inflation fluid for inflating both the passenger frontal airbag 120 and the auxiliary airbag 150. The passenger frontal airbag 120 and the auxiliary airbag 150 can thus be deployed simultaneously, or substantially simultaneously, given that inflation fluid entering the auxiliary airbag 150 would first pass through the passenger frontal airbag 120.

The auxiliary airbag 150 extends laterally inboard from the passenger frontal airbag 120 toward and even beyond the vehicle centerline 20. The auxiliary airbag 150 can be positioned adjacent, touching, or near the instrument panel 64 and can be configured to cover a portion of the instrument panel where an occupant 14 could strike in the event of an oblique collision. The configuration of the auxiliary airbag 150, and the portions of the vehicle (instrument panel 64, etc.) that it covers, can vary depending on the architecture of the vehicle in which it is installed. In the embodiment of FIGS. 1-3, the auxiliary airbag 150 has a generally rectangular configuration. The configuration of the auxiliary airbag 150 could, however, differ.

Figure 4:
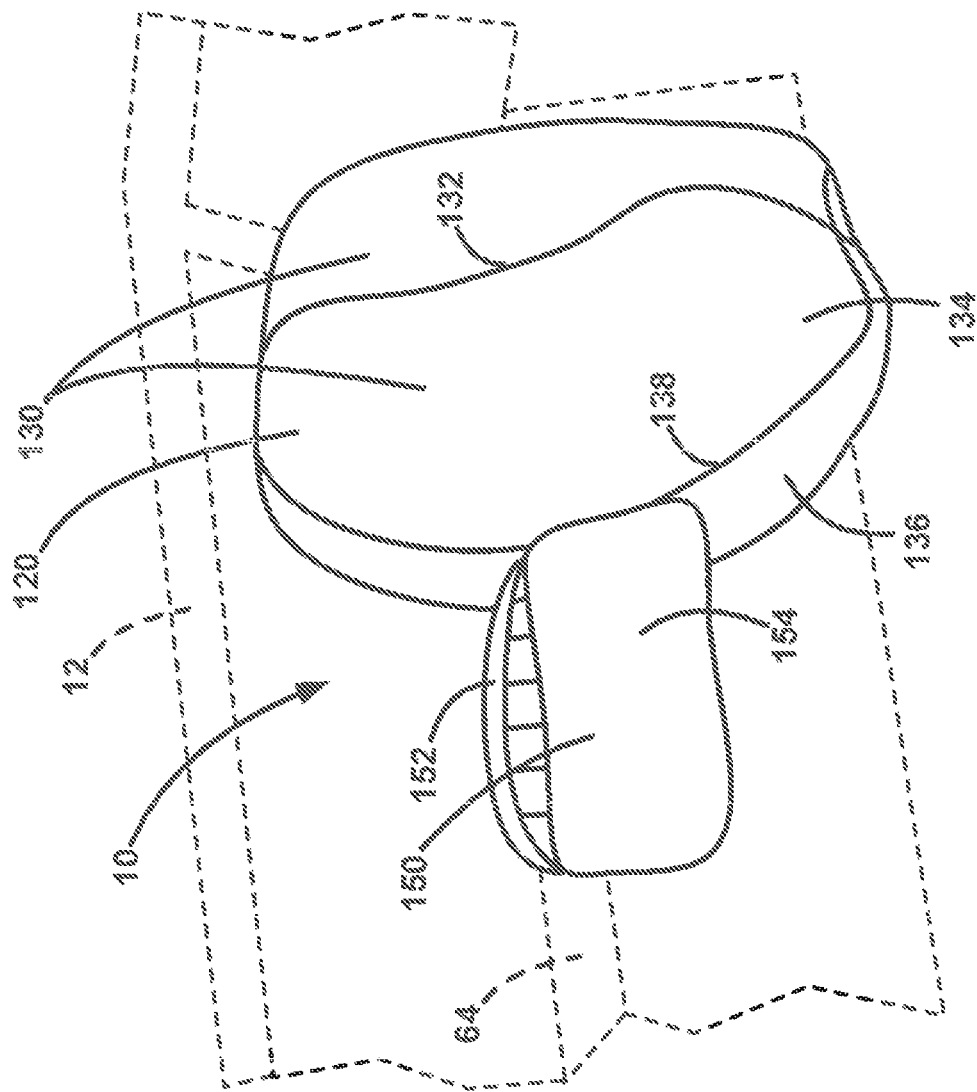
FIG. 4 is a perspective illustration of a portion of the vehicle safety system.

An example configuration of a portion of the vehicle safety system 10 is illustrated in FIG. 4. The configurations of the frontal airbag 120 and the auxiliary airbag 150 illustrated in FIG. 4 are not, however, meant to limit the use of the auxiliary airbag 150 to the illustrated configuration nor to exclude use of the auxiliary airbag from other frontal airbag configurations. In fact, the auxiliary airbag 150 can be implemented in any airbag in which auxiliary coverage/protection is desired. In this configuration, the passenger frontal airbag 120 has a generally rounded, lobed configuration including left and right lobes 130 defined by a vertically extending central tether or seam 132 that interconnects front and rear panels 134, 136 and thereby helps define or limit the inflated depth or thickness of the airbag. A side seam 138 interconnects the front and rear panels 134, 136 along a periphery of the passenger frontal airbag 120.

Figure 5:
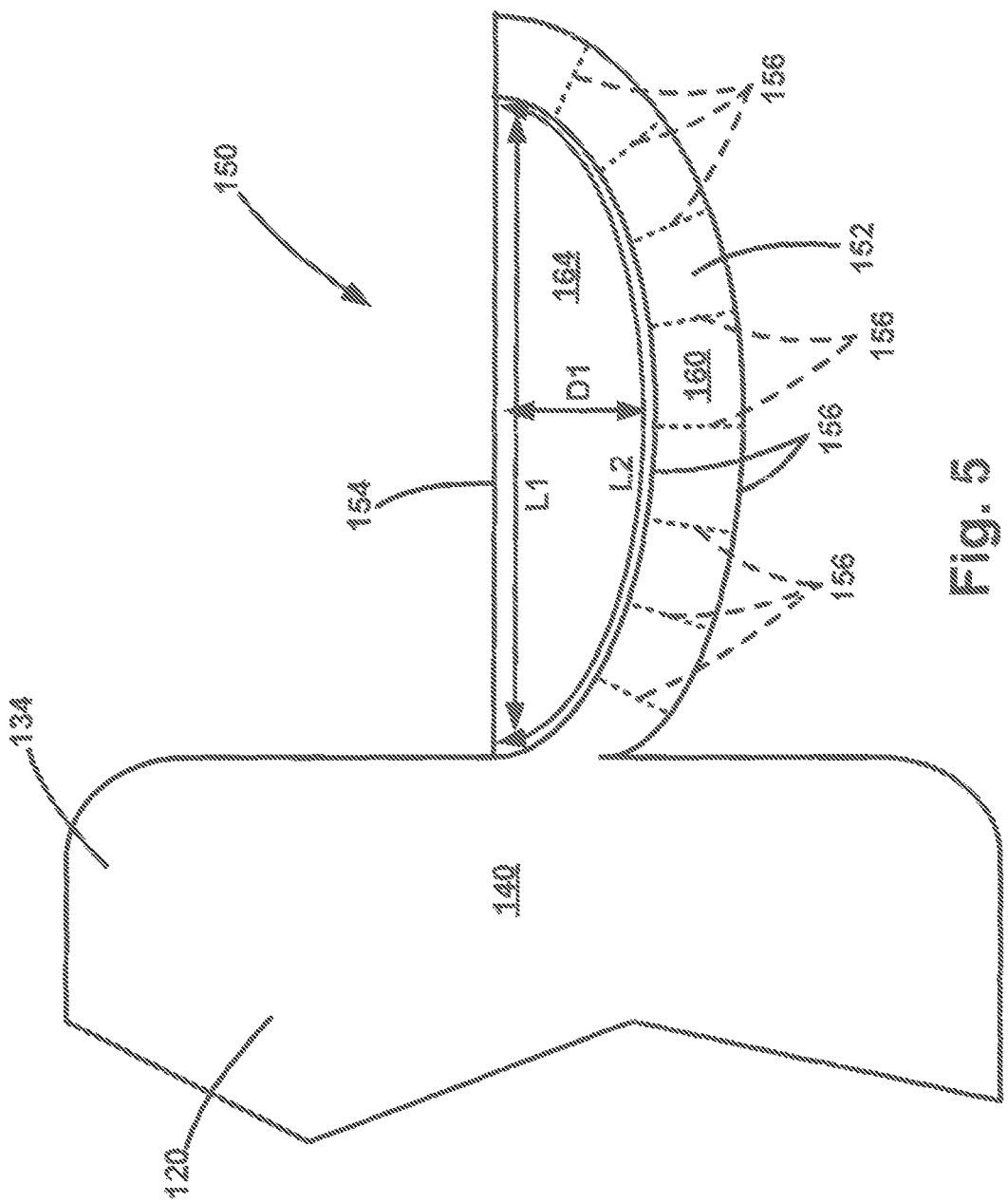
FIG. 5 is a sectional view of the portion of the vehicle safety system illustrated in FIG. 4.

Referring to FIGS. 4 and 5, the auxiliary airbag 150 can be connected to the passenger frontal airbag 120 at or near the side seam 138, by connections such as stitching, ultrasonic welding, and adhesive bonding. The auxiliary airbag 150 includes an inflatable deployment portion 152 and a restriction panel 154. The deployment portion 150 includes overlying panels of material 156 that are interconnected to define an inflatable volume 160. The connection of the auxiliary airbag 150 to the frontal airbag 120 is configured such that the inflatable volume 160 of the auxiliary airbag and an inflatable volume 140 of the frontal airbag are fluidly connected. The auxiliary airbag 150 receives inflation from the frontal airbag 120, which receives inflation fluid from the inflator 122.

Figure 6A:
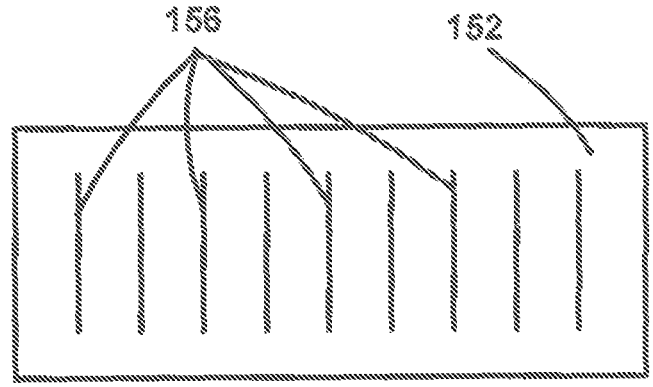
FIGS. 6A-6C are schematic illustrations depicting alternative constructions for a portion of the vehicle safety system.
Figure 6B:
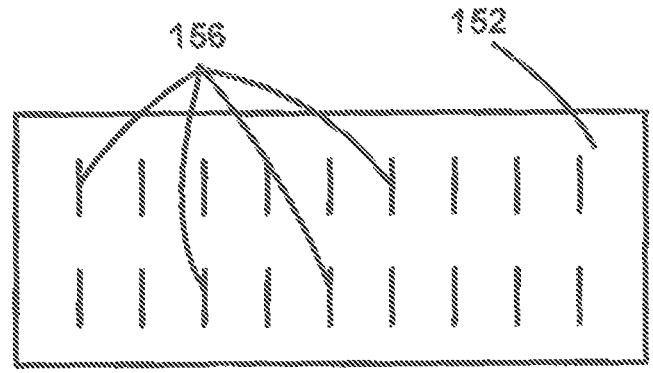
Figure 6C:
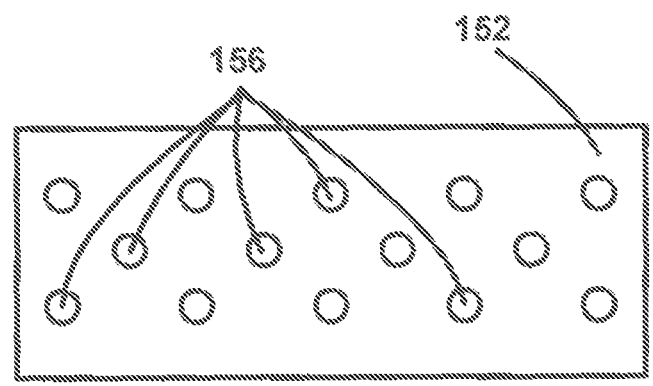

The deployment portion 152 can include interior connections 156 that interconnect the overlying panels 156 and thereby control the inflated thickness of the deployment portion. The connections 162 can have several alternative constructions. For example, the connections 162 can include stitching, ultrasonic welds, adhesive bonding, tethers, or a combination of these connections. Also, as shown in FIGS. 6A-6C, the connections 162 can have different shapes or configurations. Examples include parallel line connections (FIG. 6A), segmented line connections (FIG. 6B), and circular connections.

The restriction panel 154 is a flat panel of material, generally rectangular in shape, that has opposite ends connected to corresponding opposite ends of the deployment portion 152. As shown in FIG. 5, the restriction panel 154 has a length L1 that is shorter than the length L2 of the deployment portion 152.

Figure 7A:
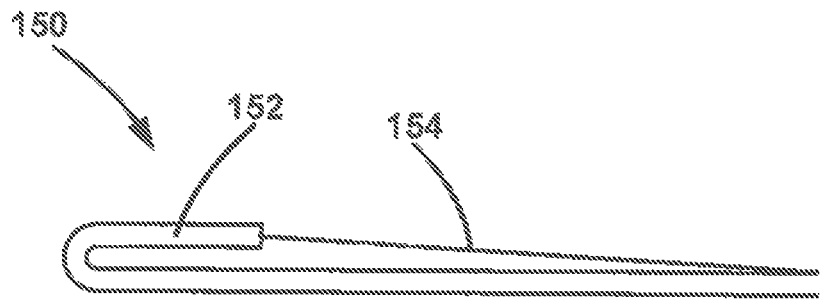
FIGS. 7A-7D are schematic illustrations depicting different manners in which a portion of the vehicle safety system can be placed in a deflated and stored condition.
Figure 7B:
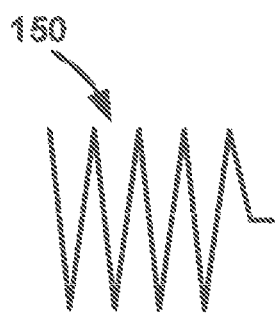
Figure 7C:
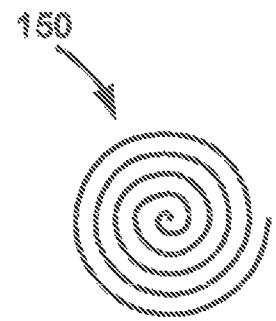
Figure 7D:
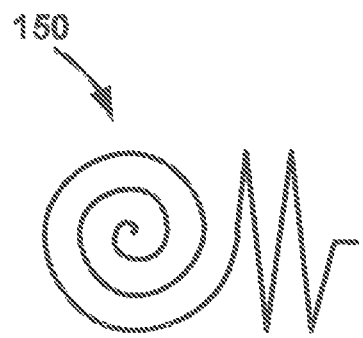

From the above, it will be appreciated that the auxiliary airbag 150 can have a thin, three layer construction—two layers for the deployment portion 152 (front and rear panels 156) and one layer for the restriction panel 154. This thin, three layer construction can be advantageous when it comes to placing the passenger frontal airbag 120 and auxiliary airbag 150 in the deflated and stored condition. As shown in FIG. 7A, The deployment portion 152 can be initially folded over in order to account for the mismatch between its length and the length of the restriction panel 154. In this deflated condition, the auxiliary airbag 150 can be 3 to 4 layers thick. Then, the auxiliary airbag 150 can be placed in the stored condition by folding (e.g., zigzag folding—FIG. 7B), rolling (FIG. 7C), or a combination of folding and rolling (FIG. 7D).

The auxiliary airbag 150 can be folded and/or rolled in this manner and then be packaged with the passenger airbag 120. Alternatively, the auxiliary airbag 150 can be folded over on top of the passenger airbag 120, and passenger airbag and auxiliary airbag can be folded and/or rolled to place the airbags in the stored condition in any of the manners illustrated in FIGS. 7B-7D. The auxiliary airbag 150 thus can have a small package size when in the deflated and folded/rolled condition and, because of this, it can be packaged along with the passenger frontal airbag 120 without any modifications to the airbag housing 124. The package size of the auxiliary airbag 150 is not significant enough to require any modification to an airbag housing 124 configured for a conventional frontal air bag.

The passenger frontal airbag 120 and the auxiliary airbag 150 have a stored condition, illustrated in dashed lines at 120', 150', in which the airbags are folded, rolled, or otherwise placed within the housing 154 (see preceding paragraph). The safety system 10 includes an inflator 152 that is actuatable to produce inflation fluid for inflating the airbags 120, 150 in a known manner. The airbags 120, 150 are inflatable from the stored condition (dashed lines at 120', 150') to the deployed condition (solid lines at 120, 150) as shown in FIGS. 2-4.

The safety system 10 also includes a sensor 90 for sensing the occurrence of an event for which deployment of the airbags is desired. The sensor 90 monitors vehicle conditions, such as acceleration, in a known manner to detect the occurrence of an event, such as a vehicle impact caused by a collision with another vehicle or object, for which occupant protection is desired. Upon detecting the occurrence of such an event, the sensor 90 sends a signal to the inflators 102, 122 via lead wires. The inflators 102, 122, when actuated, operate in a known manner to produce inflation fluid that is directed into their respective airbags 100, 120, and 150, which causes the airbags to inflate to their respective deployed positions. The airbags 100, 120, and 150, when inflated and deployed, are positioned between the occupants 14a, 14b and structure of the vehicle 12, such as the steering wheel 60 and the instrument panel 64, and help protect the occupants from impacts with that structure.

There are many vehicle collision/impact scenarios for which the driver frontal airbag 100, passenger frontal airbag 120, and auxiliary airbag 150 can help protect the vehicle occupants 14a, 14b. For example, the driver frontal airbag 100 can help protect the driver 14a if the vehicle 12 is involved in a frontal impact. Similarly, the passenger frontal airbag 120 can help protect the passenger 14b if the vehicle 12 is involved in a frontal impact. A frontal impact is meant to refer to scenarios where the impact results in the occupant 14 moving forward in the vehicle 12 in a direction generally parallel to the vehicle centerline 20 and the direction of forward vehicle travel (see arrow A). In the event of a frontal impact, the driver 14a moves forward in the vehicle 12 in a direction indicated generally by the arrow labeled B in FIG. 2 toward the steering wheel 60, and the passenger 14b moves forward in the vehicle 12 in a direction indicated generally by the arrow labeled C in FIG. 2 toward the instrument panel 64.

When a frontal impact occurs, the driver frontal airbag 100 can be sufficient to provide adequate protection to the driver 14a. Because the driver 14a travels generally in the direction C toward the steering wheel 60, the driver impacts the driver frontal airbag 100 generally squarely, moving substantially perpendicular to a lateral axis 106 of the driver frontal airbag. Because of this, the driver frontal airbag 100 receives and absorbs or dissipates the vast majority of the forces of the impacting driver 14a.

Similarly, when a frontal impact occurs, the passenger frontal airbag 120 can be sufficient to provide adequate protection to the passenger 14b. Because the passenger 14b travels generally in the direction B toward the steering wheel 60, the passenger impacts the passenger frontal airbag 120 generally squarely, moving substantially perpendicular to a lateral axis 126 of the passenger frontal airbag. Because of this, the passenger frontal airbag 100 receives and absorbs or dissipates the vast majority of the forces of the impacting passenger 14b.

An oblique impact is meant to refer to scenarios where the impact results in the occupant 14 moving obliquely forward in the vehicle 12 in a direction that is non-parallel to the vehicle centerline 20 and the direction of forward vehicle travel (see arrow A). For example, a left oblique impact can occur on the driver side 16 of the vehicle 12 in response to, for example, the vehicle skidding at an angle into another vehicle or barrier, or in response to being struck by another vehicle moving at an angle. The left oblique impact is illustrated generally by the double arrow labeled D in FIG. 3. Similarly, a right oblique impact can occur on the passenger side 18 of the vehicle 12 in response to, for example, the vehicle skidding at an angle into another vehicle or barrier, or in response to being struck by another vehicle moving at an angle. The right oblique impact is illustrated generally by the double arrow labeled E in FIG. 3.

In the event of an oblique impact, the occupants 14a and 14b move forward in the vehicle 12 in a direction that is angled either inboard of the vehicle (i.e., toward the vehicle centerline 20) or outboard of the vehicle (i.e., toward the vehicle side structure 50). In the event of a left oblique impact, the driver 14a moves outboard (arrow G) and the passenger 14b moves inboard (arrow F). Conversely, in the event of a right oblique impact, the driver 14a moves inboard (arrow F) and the passenger 14b moves outboard (arrow G).

The frontal airbags 100, 120 can help protect the occupants 14a, 14b in the event of an oblique impact, but not necessarily to the extent that they are able to help protect the occupants in a frontal impact. The degree to which the frontal airbags 100, 120 can help protect the occupants 14a, 14b in an oblique impact depends on the degree to which the occupants movement deviates from the forward direction (i.e., the angle between arrow A and D or between arrow A and E). As the degree to which the occupant movement deviates from the forward direction, i.e., as the angle increases, the ability of the frontal airbags 100, 120 to help protect the occupants 14a, 14b also decreases. Thus, as the occupants' movements become increasingly oblique, the ability of the frontal airbags 100, 120 to help protect the occupants 14a, 14b decreases.

Known safety systems can include features that help protect the occupant in the event of an oblique impact that causes the occupant 14 to move forward and outboard in the vehicle 12. For example, side impact airbags or curtain airbags, both of which are inflatable between the occupant 14 and the side structure 50, can help protect the occupant in the event of an oblique impact that moves them in the forward-outboard direction.

The auxiliary airbag 150 can help to address some unique challenges presented by oblique impacts. For example, when oblique impacts can cause the occupants 14a, 14b to move in a forward and inboard direction (arrow F), the occupants move toward the positions indicated generally in dashed lines in FIG. 4. Of course, the oblique direction in which the occupant 14 moves, and their resulting position, can vary depending on the particulars of the impact event, such as the angle and/or velocity at which the vehicle 12 impacts another vehicle or object. Therefore, the oblique inboard direction of occupant movement indicated by arrow F and the resulting positions of the occupants 14a and 14b are by way of example only.

Advantageously, the auxiliary airbag 150, both alone and in combination with the passenger frontal airbag 120 and driver frontal airbag 100 can help protect the vehicle occupants 14b and 14a in the event of an oblique condition (left oblique D, right oblique E) that results in forward-inboard occupant movement (arrow F). The auxiliary airbag 150 is configured to cooperate with the architecture of the vehicle 12 in order to provide the bag with the structural integrity necessary to help protect the occupant. The forward-inboard oblique collision is unique in that the safety system 10 must react to and absorb or otherwise cushion both forward and inboard occupant movement.

The driver frontal airbag 100 may not be particularly adept at this function, as it is necessarily limited in width/radius owing to the fact that it is steering wheel mounted. Additionally, its rounded, oblong face presented toward the driver 14*a* is more likely to cause the forward-inboard moving driver to slide or otherwise come off the driver frontal airbag 100. Further, the forward-inboard movement of the driver 14*a* presents the possibility that the driver can escape the shoulder belt portion 34 of the seatbelt 30.

The passenger frontal airbag 120 may be more adept at reacting to and absorbing or otherwise cushioning both forward and inboard occupant movement due to its increased size and coverage of the instrument panel 64. Nevertheless, there still exists some areas, such as central portions of the instrument panel, that may lack adequate coverage. Additionally, the passenger 14*b* is more likely to be positioned away from the traditional/normal seating position at the time of the oblique impact. These out of position occupants can, for example, be leaned against the side structure 50, can have the seat 22 in a reclined position, can be leaned forward or toward the vehicle centerline 20, for example leaning on the center armrest 68. Forward-inboard movement of an out of position passenger 14*b* can also result in the passenger frontal airbag 120 to provide less than adequate coverage, as the passenger could "miss" or partially "hit" the airbag 120. Forward-inboard movement of the passenger 14*b* can also present the possibility that the passenger can escape the shoulder belt portion 34 of the seatbelt 30.

The auxiliary airbag 150 can be shaped commensurate with the vehicle structure and the frontal airbag 120 from which it is deployed. In the illustrated example configuration, the auxiliary airbag 150 can have a generally rectangular configuration. The shape of the auxiliary airbag 150 is not as important to its configuration as is the need to provide coverage to the desired portion of the uncovered area between the airbags 100 and 120. To this extent, the auxiliary airbag 150 can span the space between the frontal airbags 100, 120 and can even engage the driver frontal airbag 100. The driver frontal airbag 100, passenger frontal airbag 120, and auxiliary airbag 150 can thus provide an inflated wall of protection that spans from adjacent or near the side structure 50 on the driver side 16 of the vehicle 12 to adjacent or near the side structure on the passenger side 18 of the vehicle.

When the auxiliary airbag 150 is inflated and pressurized, the deployment portion 152 tends to assume its generally flat rectangular configuration. However, because it has opposite ends connected to opposite ends of the restriction panel 154, the deployment portion 152 is restricted such that it can only assume the curved configuration shown in FIGS. 2-5, presented concavely toward the restriction panel. In this configuration, the restriction panel 154 spans across and closes or covers the length between the ends of the deployment portion 152. As shown in FIG. 5, the concavely curved deployment portion 152 and the restriction panel 154 encircle and define a space 164. The deployment portion 152 helps position the restriction panel 154 and maintain the space 164 between. The auxiliary airbag 150 thus has a depth having a depth D1, which represents the maximum distance.

Airbag pressurization causes the restriction panel 154 to become tensioned between the opposite ends of the deployment portion 152. As a result of this tension, the auxiliary airbag 150 can resist penetration of an impacting occupant 14 into its depth D1, thereby creating a desired cushioning effect to help protect the impacting occupant. Advantageously, the cushioning effect provided by the auxiliary airbag 150 can be provided without requiring that the entire space 164 be an inflatable volume, as is the case with conventional airbags. It is because of this that the auxiliary airbag 150 can be implemented without necessarily increasing the size of the inflator 122. The inflatable volume 160 of the auxiliary airbag 150 can be small compared to the volume of the space 164 defined by the deployment portion 152 and the restriction panel 154.

The reduction in inflatable volume of the auxiliary airbag 150 does not come at the expense of providing adequate cushioning characteristics. Those skilled in the art, given knowledge of the teachings herein, will appreciate that the cushioning ability of the auxiliary airbag 150 depends on a variety of factors that can be configured to provide the desired cushioning effect. For example, the differential between the lengths L1 and L2 of the restriction panel 154 and the deployment portion 152 helps determine the inflated depth D1 of the auxiliary airbag 150. As another example, the pressurization of the deployment portion 152, which is determined by the size of the inflator 122, helps determine the tension applied to the restriction panel 154. As another example, the configuration of the connections 162 (see FIGS. 6A-6C) can be selected to control the volume of the deployment portion 152, which affects its pressurization and therefore helps determine the tension applied to the restriction panel 154. As a further example, the size of the deployment portion 152 determines the surface area of the panels 156 subjected to pressurization and, therefore, helps determine the tension applies to the restriction panel 154. Through factors such as these, the auxiliary airbag 150 can be configured to produce the desired cushioning effect for the occupant 14.

Additionally, because the auxiliary airbag 150 is connected to the passenger frontal airbag 120 and receives its inflation fluid from the passenger frontal airbag, the frontal airbag can deploy substantially prior to the auxiliary airbag. In this manner, the frontal airbag 120 can initially deploy rearward in the vehicle toward its deployed position. When the frontal airbag 120 reaches a certain degree of inflation and pressurization, the auxiliary airbag 150 will begin receiving inflation fluid and begin to deploy. The frontal airbag 120 can thus deploy partially and/or substantially before the auxiliary airbag 150. The frontal airbag 120 can deploy rearward in the vehicle 12, followed by the auxiliary airbag 150, which deploys laterally in the vehicle. Since the auxiliary airbag 150 has a construction in which the inflatable deployment portion 152 has a small volume, it will inflate and deploy quickly so as to reach the desired position within the desired period of time. Advantageously, this also allows the large volume frontal airbag 120 to inflate and deploy quickly because the auxiliary airbag 150 does not divert a significant volume of inflation fluid from the frontal airbag.

The auxiliary airbag 150 is illustrated and described as being implemented with a passenger frontal airbag 120. The auxiliary airbag 150 could, however, have alternative implementations. For example, the auxiliary airbag could be implemented with a driver frontal airbag 120. In this implementation, the auxiliary airbag could have a radial configuration and extend radially from the central frontal airbag. As another implementation, the auxiliary airbag could be implemented in a driverless automobile, where it is envisioned that the entire steering wheel may not necessarily rotate in the traditional sense, instead, for example, only the rim moves or rotates in a steer-by-wire system.

Additionally, the auxiliary airbag 150 could be implemented in other conventional airbags, such as door-mounted side impact airbags, seat-mounted side impact airbags, pillar airbags, curtain airbags, frontal airbags for rear seat occupants, knee bolsters, and inflatable seatbelts.

From the above description of the invention, those skilled in the art will perceive applications, improvements, changes and modifications to the invention. Such applications, improvements, changes and modifications within the skill of the art are intended to be covered by the appended claims.

The invention claimed is:

1. An apparatus for helping to protect an occupant of a vehicle, comprising:
  a main airbag inflatable to cover a portion of a vehicle and to help provide protection from impacts with the covered portion of the vehicle; and
  an auxiliary airbag connected to the main airbag, the auxiliary airbag being inflatable to cover portions of the vehicle left uncovered by the main airbag;
  wherein the auxiliary airbag comprises a deployment portion and a restriction panel, the deployment portion being inflatable to extend from the main portion and having a first length, the restriction panel having a second length that is shorter than the first length, the restriction panel overlying the deployment portion and having opposite ends connected to opposite ends of the deployment panel; and
  wherein the deployment portion, when inflated, is configured to tension the restraining panel between the opposite ends of the deployment portion and position the restraining panel for receiving and absorbing impacts.

2. The apparatus recited in claim 1, wherein the restriction panel restricts movement of the deployment portion so that the deployment portion assumes a curved configuration when inflated and pressurized facing concavely toward the restriction panel and thereby creating a space between the restriction panel and the deployment portion.

3. The apparatus recited in claim 1, wherein the restriction panel and the deployment portion each have a generally rectangular configuration.

4. The apparatus recited in claim 1, wherein the deployment portion comprises overlying panels interconnected to define an inflatable volume, the auxiliary airbag being connected to the main airbag so that the inflatable volume of the auxiliary airbag is placed in fluid communication with an inflatable volume of the main airbag.

5. The apparatus recited in claim 4, wherein the deployment portion comprises interior connections that interconnect the overlying panels to limit the inflated thickness of the deployment portion.

6. The apparatus recited in claim 1, wherein the deployment portion comprises overlying panels interconnected to define an inflatable volume, and wherein the restriction panel overlies the panels of the deployment portion.

7. The apparatus recited in claim 6, wherein in the deflated condition, the auxiliary airbag is configured so that the restriction panel and the panels of the deployment portion are 3 to 4 panel layers thick.

8. The apparatus recited in claim 7, wherein the auxiliary airbag, in the deflated condition, can be placed in the stored condition by at least one of rolling and folding the overlying panels.

9. The apparatus recited in claim 1, wherein the auxiliary airbag is configured to inflate and deploy laterally from the main airbag.

10. The apparatus recited in claim 1, wherein the main airbag is a passenger frontal airbag.

11. The apparatus recited in claim 10, wherein the auxiliary airbag is configured to deploy laterally inboard from the passenger frontal airbag.

12. The apparatus recited in claim 10, wherein the auxiliary airbag is configured to cover a portion of an instrument panel of the vehicle positioned laterally inboard of the passenger frontal airbag.

13. The apparatus recited in claim 1, wherein the auxiliary airbag is configured to be positioned when inflated and deployed to receive an occupant moving obliquely with respect to the main airbag.

14. The apparatus recited in claim 1, wherein the auxiliary airbag is configured to be positioned when inflated and deployed overlying an instrument panel of a vehicle between a passenger frontal airbag and a driver frontal airbag.

15. An airbag module comprising a housing, an inflator, and the apparatus recited in claim 1, wherein the housing supports the inflator, the main airbag, and the auxiliary airbag, and the inflator is actuatable to supply inflation fluid for inflating the main airbag and the auxiliary airbag.

16. A vehicle safety system comprising:
  a frontal airbag configured to inflate from an instrument panel of a vehicle to a deployed condition covering a portion of the instrument panel; and
  an auxiliary airbag connected to the frontal airbag and inflatable to deploy laterally inboard from the frontal airbag to cover a portion of the instrument panel left uncovered by the frontal airbag;
  wherein the auxiliary airbag comprises a deployment portion and a restriction panel, the deployment portion being inflatable to inflate laterally inboard from the frontal airbag and having a first length, the restriction panel having a second length that is shorter than the first length, the restriction panel overlying the deployment portion and having opposite ends connected to opposite ends of the deployment panel; and
  wherein the deployment portion, when inflated, is configured to tension the restraining panel between the opposite ends of the deployment portion, the restriction panel restricting movement of the deployment portion in response to inflation so that the deployment portion assumes a curved configuration when inflated and pressurized facing concavely toward the restriction panel and thereby creating a space between the restriction panel and the deployment portion for receiving and absorbing impacts.

17. The vehicle safety system recited in claim 16, further comprising a housing and an inflator, wherein the housing supports the inflator, the frontal airbag, and the auxiliary airbag, and the inflator is actuatable to supply inflation fluid for inflating the frontal airbag and the auxiliary airbag.

18. An auxiliary airbag connectable to a main airbag and being inflatable to cover portions of the vehicle left uncovered by the main airbag, the auxiliary airbag comprising:
  a deployment portion inflatable to extend from the main portion and having a first length;
  a restriction panel having a second length that is shorter than the first length, the restriction panel overlying the deployment portion and having opposite ends connected to opposite ends of the deployment panel;
  wherein the deployment portion, when inflated, is configured to tension the restraining panel between the opposite ends of the deployment portion, the restriction panel restricting movement of the deployment portion in response to inflation so that the deployment portion assumes a curved configuration facing concavely toward the restriction panel and thereby creating a space between the restriction panel and the deployment portion for receiving and absorbing impacts.

19. An airbag module comprising a housing, an inflator, a main airbag, and the auxiliary airbag recited in claim 18, wherein the housing supports the inflator, the main airbag, and the auxiliary airbag, and the inflator is actuatable to supply inflation fluid for inflating the main airbag and the auxiliary airbag.

* * * * *